United States Patent [19]

Malone et al.

[11] Patent Number: 5,645,615
[45] Date of Patent: Jul. 8, 1997

[54] MOLTEN DECOMPOSITION APPARATUS AND PROCESS

[75] Inventors: Donald P. Malone, Grayson; Charles B. Miller, Ashland, both of Ky.; Jonathan A. Wiseman, Pedro, Ohio

[73] Assignee: Ashland Inc.

[21] Appl. No.: 513,035

[22] Filed: Aug. 9, 1995

Related U.S. Application Data

[63] Continuation of Ser. No. 163,468, Dec. 7, 1993, abandoned, which is a continuation-in-part of Ser. No. 930,250, Aug. 13, 1992, abandoned.

[51] Int. Cl.⁶ ............................................. C10J 3/57
[52] U.S. Cl. .................................... 48/92; 48/197 R
[58] Field of Search ............................. 48/92, 197 R, 48/203, 209, 210; 423/418.2; 266/270, 225

[56] References Cited

U.S. PATENT DOCUMENTS

| | | | |
|---|---|---|---|
| 2,612,444 | 9/1952 | Pummel | 48/92 |
| 2,625,465 | 1/1953 | Dresser et al. | 423/418.2 |
| 3,076,642 | 2/1963 | Dhemein | 266/41 |
| 3,397,878 | 8/1968 | Holmes et al. | 266/41 |
| 3,529,955 | 9/1970 | Themelis | 75/60 |
| 3,533,739 | 10/1970 | Pelazarski | 48/92 |
| 3,545,962 | 12/1970 | Themelys et al. | 75/76 |
| 3,635,672 | 1/1972 | Johnson | 423/418.2 |
| 3,945,820 | 3/1976 | Frotzmann et al. | 266/225 |
| 4,244,180 | 1/1981 | Roser | 48/197 R |
| 4,459,137 | 7/1984 | Tanoue | 48/197 R |
| 4,511,372 | 4/1985 | Axelsson | 48/92 |
| 4,553,742 | 11/1985 | Summer et al. | 48/92 |
| 4,565,551 | 1/1986 | Okane et al. | 48/92 |
| 4,591,380 | 5/1986 | Summers et al. | 48/92 |
| 4,681,599 | 7/1987 | Obkircher | 48/92 |
| 4,687,183 | 8/1987 | Langen | 48/92 |
| 4,750,716 | 6/1988 | Reeve-Parker | 266/225 |
| 4,792,126 | 12/1988 | Nogy et al. | 266/225 |
| 4,913,735 | 4/1990 | Palmer | 266/225 |
| 4,930,757 | 6/1990 | Manwell | 266/270 |
| 5,069,715 | 12/1991 | Reid | 266/160 |
| 5,308,043 | 5/1994 | Floyd et al. | 266/225 |
| 5,435,819 | 7/1995 | Miller et al. | 48/92 |

FOREIGN PATENT DOCUMENTS

| | | | |
|---|---|---|---|
| 2186524 | 11/1974 | France | 48/92 |
| 2443740 | 3/1975 | Germany | 48/206 |
| 2443770 | 3/1975 | Germany | 48/206 |
| 2521080 | 11/1975 | Germany | 48/92 |
| 2713864 | 10/1978 | Germany | 48/92 |
| 2095282 | 9/1982 | United Kingdom | 48/197 R |
| 2189504 | 4/1986 | United Kingdom | 48/92 |
| WO81002429 | 9/1981 | WIPO | 423/418.2 |

*Primary Examiner*—Timothy McMahon
*Attorney, Agent, or Firm*—Donald E. Zinn; Richard D. Stone; Richard C. Willson, Jr.

[57] ABSTRACT

In an improved molten metal hydrogen generation bath, baffles form a draft tube or chimney-effect near the center of the bath. Flow through the chimney is aided by maintaining a temperature differential favoring convection and, optionally, a differential pressure between the portions of the bath on either side of the baffle-chimney arrangement. Feed is added to the feed zone and oxygen is added to the oxidation zone, emitting $H_2$ from the feed zone and CO from the oxidation zone. Baffles may be made simply of brick work or high temperature metal and can fit into existing refractory-lined molten metal vessels. Products can be mixed as syngas feed for Fischer-Tropsch synthesis. Additionally, the Boudouard endothermic reaction ($CO_2$ + $C \rightarrow 2CO$) can be used to control temperatures by injecting CO in place of oxygen.

5 Claims, 6 Drawing Sheets

SECTION 1 - 1

MOLTEN DECOMPOSITION APPARATUS AND PROCESS

This is a Continuation of application Ser. No. 08/163,468 filed Dec. 7, 1993 now abandoned, which is a continuation-in-part of application Ser. No. 07/930,250, filed Aug. 13, 1992 now abandoned.

CROSS REFERENCE TO RELATED APPLICATIONS

U.S. patent application Ser. Nos. 542,234, filed Jun. 21, 1990 now abandoned; 625,350, filed Dec. 11, 1990 now abandoned; 838,642, filed Feb. 20, 1992; and 763,097, filed Sep. 20, 1991 now abandoned; all relate to the general field of the present invention.

BACKGROUND OF THE INVENTION

1. Field of the Invention

The present invention relates to the general field of molten baths for the disassociation of material containing carbon, and preferably hydrogen as well, generally classified in U.S. Patent Office, Class/Subclass: 60/39.12, 48/195, and 23/230A.

2. Description of the Prior Art

U.S. Pat. No. 4,187,672 and U.S. Pat. No. 4,244,180 to Rasor feed a mass of carbonaceous fuel; e.g., coal, into a high temperature liquid; e.g., molten iron, at a temperature high enough to carbonize the feed; e.g., near 2850° F. (1565° C.) and introduces air or other oxygen source into the reactor to react with carbon dissolved in the liquid and uses the hot fuel gas to produce useful energy.

WO 9Z/01492 to Nagel teaches two immiscible zones (layers) of different molten metal temperatures.

Mayes U.S. Pat. No. 4,338,096 teaches methods for controlling the flow of molten-mass reaction medium into a reaction zone by utilizing a gas-lift effect on the molten medium and apportioning the flow of control gas to the desired flow of molten medium. Mayes does not suggest movement of liquid from one zone to another by means of convection.

Bach U.S. Pat. No. 4,574,714, and U.S. Pat. No. 4,602,574 do not suggest the plural zones of the present invention with organic feed introduced into one zone and oxidizer introduced into a second zone, and with the vapor phases and liquid phases of the two zones being separated by barriers as in the present invention.

Tyrer U.S. Pat. No. 1,803,221 teaches production of hydrogen from methane in a two-zone unit, but provides no means for flow by convection between the two zones and does not suggest the specialized baffle separators of the present invention.

Axelsson U.S. Pat. No. 4,511,372 does his whole process in a single vessel at high pressure, primarily to suppress dust.

The lance of the present invention can be distinguished from the conventional tuyeres commonly used in steel making, in that the tuyeres are submerged into the molten steel and do not pass through any substantial portion of the molten steel. Further, the tuyeres are generally used for introducing oxygen, argon, and other gases, whereas the present lances are particularly used for introducing feed materials which contain hydrocarbons which can cause substantial coking. Therefore, it is a particular objective of the present invention to substantially reduce the amount of coking formed within the conduit or lance of the invention. This reduces the plugging difficulty which is often encountered with lances operating at these high temperatures, particularly when the lances are injecting liquids comprising hydrocarbons.

SUMMARY OF THE INVENTION

1. General Statement of the Invention:

Referring to FIG. 1, according to the invention, a vessel having top and bottom walls a feed zone and an oxidizing zone and containing a molten bath to levels 116, 118 respectively for the decomposition of carbon- (and preferably hydrogen-) containing materials is improved by providing upwardly extending submerged baffle means 114 above the bottom wall abutting the feed zone and defining one wall of a recycle zone (chimney) 108 communicating between liquid in the oxidizing zone and in the feed zone. The invention also comprises horizontal extending baffle means 115 above the bottom wall. The horizontally extending submerged baffle means 115 is integral with a lower portion of the downwardly extending baffle means 114 and arranged so as to define the lower end of a generally L-shaped recycle zone 108, much as a hearth is arranged beneath a chimney. The invention further comprises vapor zone separator or baffle means 112, the vapor zone separator means separates the vapor space above the liquid baths so that the vapor space of the feed zone is separated from the vapor space of the oxidizing zone. This vapor zone separator means 112 abuts the oxidizing zone and extends downward into the liquid of the oxidizing zone to define the other wall of said chimney of the recycle zone 108, but not sufficiently far so as to contact the horizontal extending baffle means 115.

Apparatus:

Closed vessel 100: The vessel includes a top wall 100A and a bottom wall 100B and is preferably lined with brick or castable refractories and may be pre-stressed to maintain the refractories in compression even when the vessel is pressurized and hot.

Downwardly extending baffle means 114 and horizontal extending baffle means 115 can be made of refractory materials or even of tungsten, tantalum, or other high-melting refractory metal which may be coated with refractory ceramics.

Vapor zone separator means 112 will preferably be of the same material as downwardly extending baffle means 114, and will preferably be hermetically attached to the top wall of closed vessel 100.

Oxidizer feed means 107 can be any suitable, tuyere design, well-known in the steel-making industry.

Feed inlet 105 can operate by gravity or pump (high pressure pump if the vessel operates under pressure).

Fischer-Tropsch Synthesis

The preferred CO and $H_2$ products are useful for the conventional Fischer-Tropsch synthesis taught e.g., in Chemical Process Industries by R. Norris Schreve, McGraw-Hill, 1967, p. 775.

Boudouard Reaction:

This reaction, discussed in U.S. Pat. Nos. 4,412,914, 4,450,241, 4,869,879, and 4,915,820 all to W. P. Hettinger et al, reacts injected $CO_2$ with carbon in the molten metal to form 2CO and cool the melt as desired.

Metal:

While iron is most preferred for specialized applications, copper, zinc, especially chromium, manganese, or nickel, or other meltable metal in which carbon is somewhat soluble, may be used alone or in mixture.

Feed Materials:

Natural gas ($CH_4$), liquified petroleum gas (LPG), propane, petroleum naphtha, light or heavy distillate, vacuum and other resids, solvent de-asphalted pitch (SDA), aromatic extracts, FCC slurry oil; trash garbage, tires, coal and virtually any other hydrocarbon-containing material.

Products:

Products are CO, $CO_2$, $H_2$ plus sulfur and other contaminants in feed which may be outputted in slag which can be periodically drained off. In refineries, sulfur is preferably outputted as gas in the hydrogen stream and is then treated conventionally by the Claus process and the SCOT (Shell Claus Offgas Treatment) unit.

Controls:

Conventional analog or digital controls are used, measuring temperature, preferably with optical or infrared pyrometer or protected thermocouple; carbon by spectrometer; level by nuclear radiation and admitting feed, $CH_3$, $CO_2$, $H_2O$ to maintain temperature, which must, of course, be high enough (e.g., at least 1,250° C. in feed zone, 1,300° C. in oxidizing zone) to maintain the particular metal carbon composition liquid and dissolved carbon level and $H_2$ production within preset limits. Temperature is preferably 1,150° to 1,600°, more preferably 1,250° to 1,500°, and most preferably 1,300° to 1,450° C. in the feed zone, and usually preferably 50° to 150° C. higher in the oxidation zone.

Batch/Continuous Operation:

While the Examples describe the invention on a continuous basis, it may, of course, be practiced on a batch or semi-batch basis with discontinuous flows of starting materials into the molten-metal vessel and with intermittent withdrawal of slag and/or product gases.

Flexibility:

Wide ranges of feed rate, feed composition, and contaminants can be accommodated, even wide swings over short time intervals.

2. Utility of the Invention:

The present invention is useful for the production of a wide variety of end-products, including all those which can be produced by the well-known Fischer-Tropsch process, e.g., naphthas, diesel fuel, jet fuel (kerosene), as particularly commercialized by Sasol in South Africa. The Mobil Oil "M-Gas" process (U.S. Pat. No. 3,998,899, etc.) may be employed. At the present time, the invention will be particularly valuable for the flexible production of reformulated fuels as mandated or as desirable for protection of the environment, e.g., methanol, methyl tertbutyl ether (MTBE) and tert amyl ether (TAME), etc. In its preferred embodiments, the invention functions entirely from distress or low-valued hydrocarbons, air (for oxidation), and water (to supply hydrogen and additional oxygen). It is particularly noteworthy that the invention can utilize the exothermic carbon oxidation reaction so that it can function without need for external energy input. Additionally, the endothermic Boudouard reaction ($CO_2+C \rightarrow 2CO$) can be used to control temperature within the two reaction zones, and particularly to control the differentials so as to adjust convection circulation of materials between the zones as desired.

Syngas uses, per Kirk-Othmer, $CO/H_2$ without any other reactants as building blocks, e.g., glycol synthesis, modified Fischer-Tropsch syntheses to olefins or waxes, and acetic acid synthesis; those involving $CO/H_2$ and employed to make additional use of compounds derived from synthesis gas, e.g., homologation of methanol to ethanol; those that use a deravative based on $CO/H_2$, e.g., methanol, as a starting material for a further reaction sequence, e.g., Mobil's MTG (methanol to gasoline) process or the vinyl acetate process; and energy-efficient processes, e.g., those that make syngas for use in combined-cycle plants; and those that use the carbon monoxide for subsequent syntheses, e.g., of acetic anhydride, acrylates, Koch acids, etc.

DESCRIPTION OF THE PREFERRED EMBODIMENTS

Figure 1:
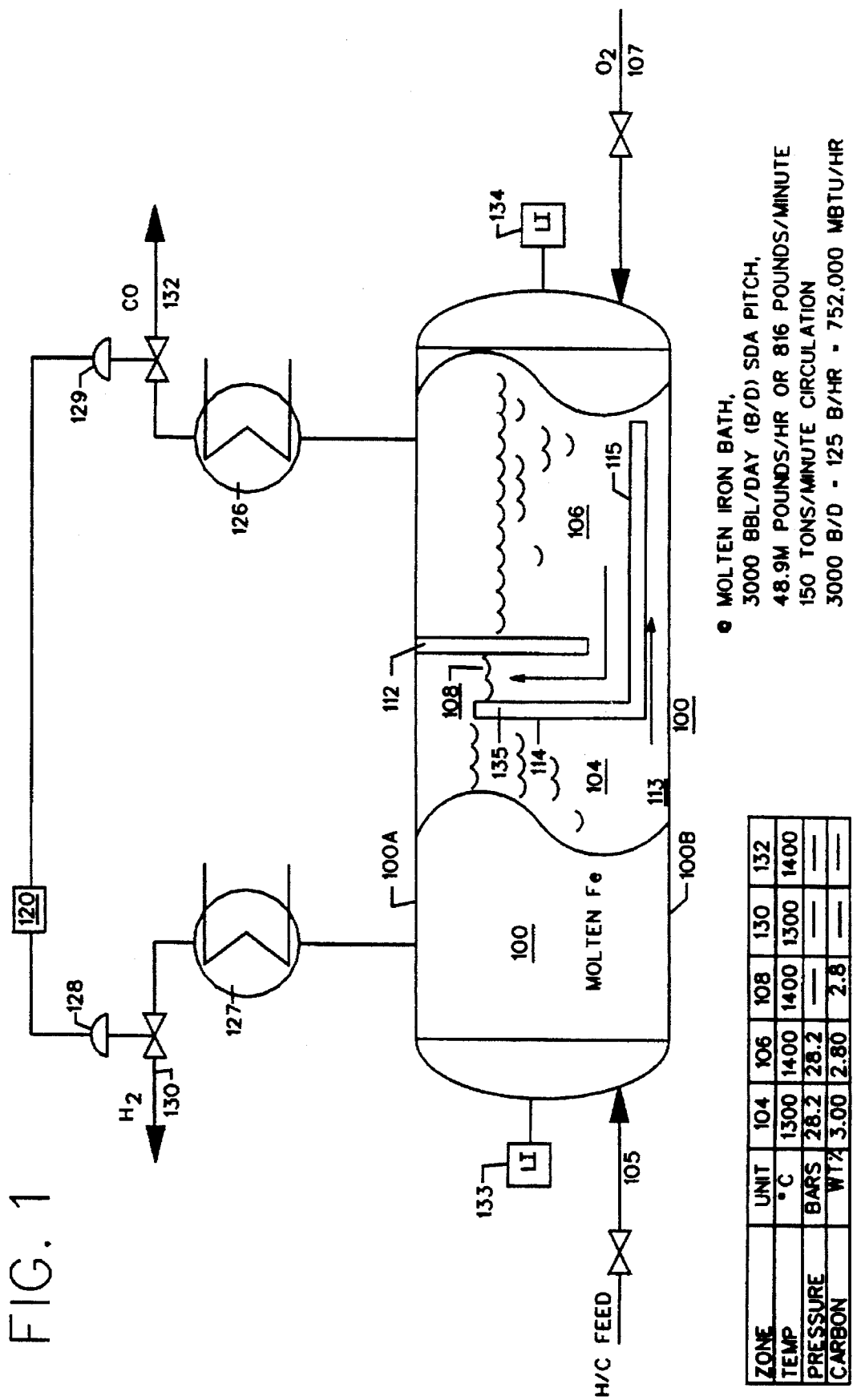
FIG. 1 is a schematic diagram of a section view of the closed vessel 100 showing the feed zone 104 and the oxidizing zone 106 separated by the chimney/hearth-like recycle zone 108 defined by downwardly extending baffle means 114/horizontal extending baffle means 115 and vapor zone separator means 112, along with the vessel 100.

Referring to FIG. 1, the main vessel (a refractory-lined steel vessel 100) encloses and partially defines feed zone 104, oxidizing zone 106, lower circulation zone 113, and L-shaped recycle zone 108. Feed zone 104 receives feed through feed inlet 105. Oxygen enters through oxidizer feed means 107 into oxidizing zone 106. Oxidizing zone 106 and recycle zone 108 are controlled by pressure control means 120 which acts on control valve 128 and control valve 129 to throttle H2 outlet 130 and CO outlet 132 differentially as desired. Cooler 127 and cooler 126 protect control valve 128 and control valve 129 by cooling the products. Level controllers 133 and level controller 134 control the level in the feed and in the oxidizing zone, respectively, and feed signals to pressure control means 120 to maintain those levels.

Figure 4:
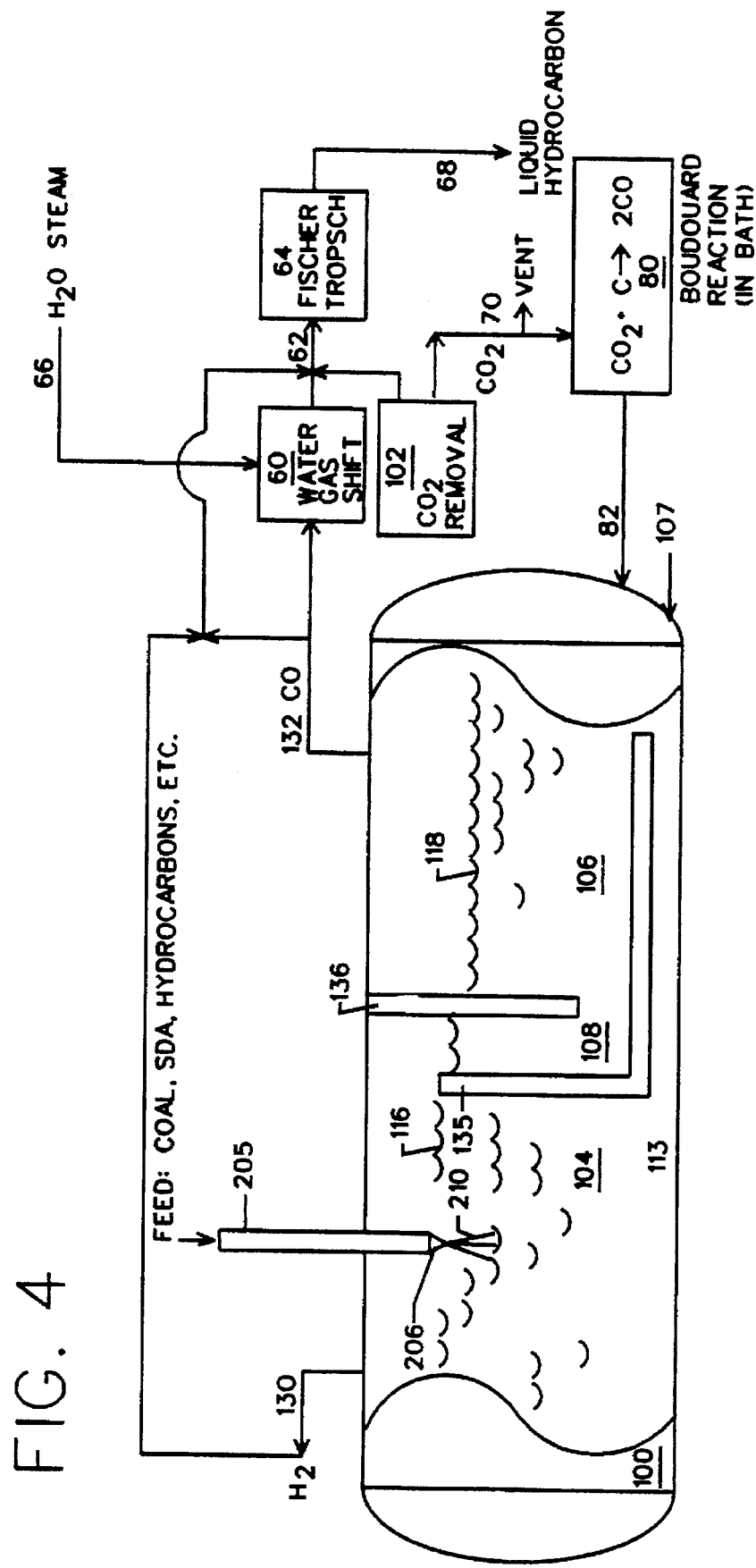
FIG. 4 shows a preferred lance, with the lance in place as element 205 impinging on the surface of the liquid so and actually piercing it, forming bubbles.
Figure 5:
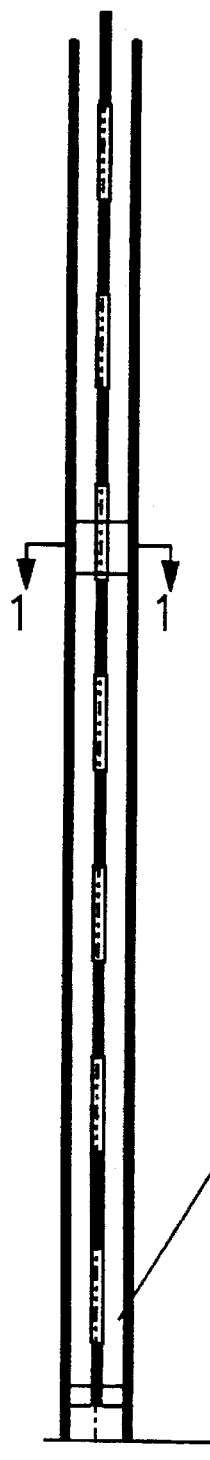
FIG. 5 is a schematic of a more preferred lance.
Figure 5A:
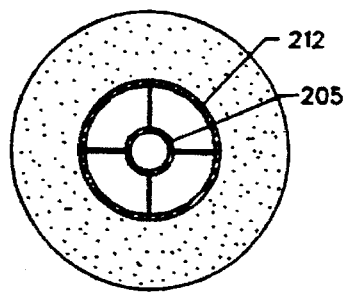
FIG. 5A is a cross sectional area at section 11 of the lance.
Figure 6:
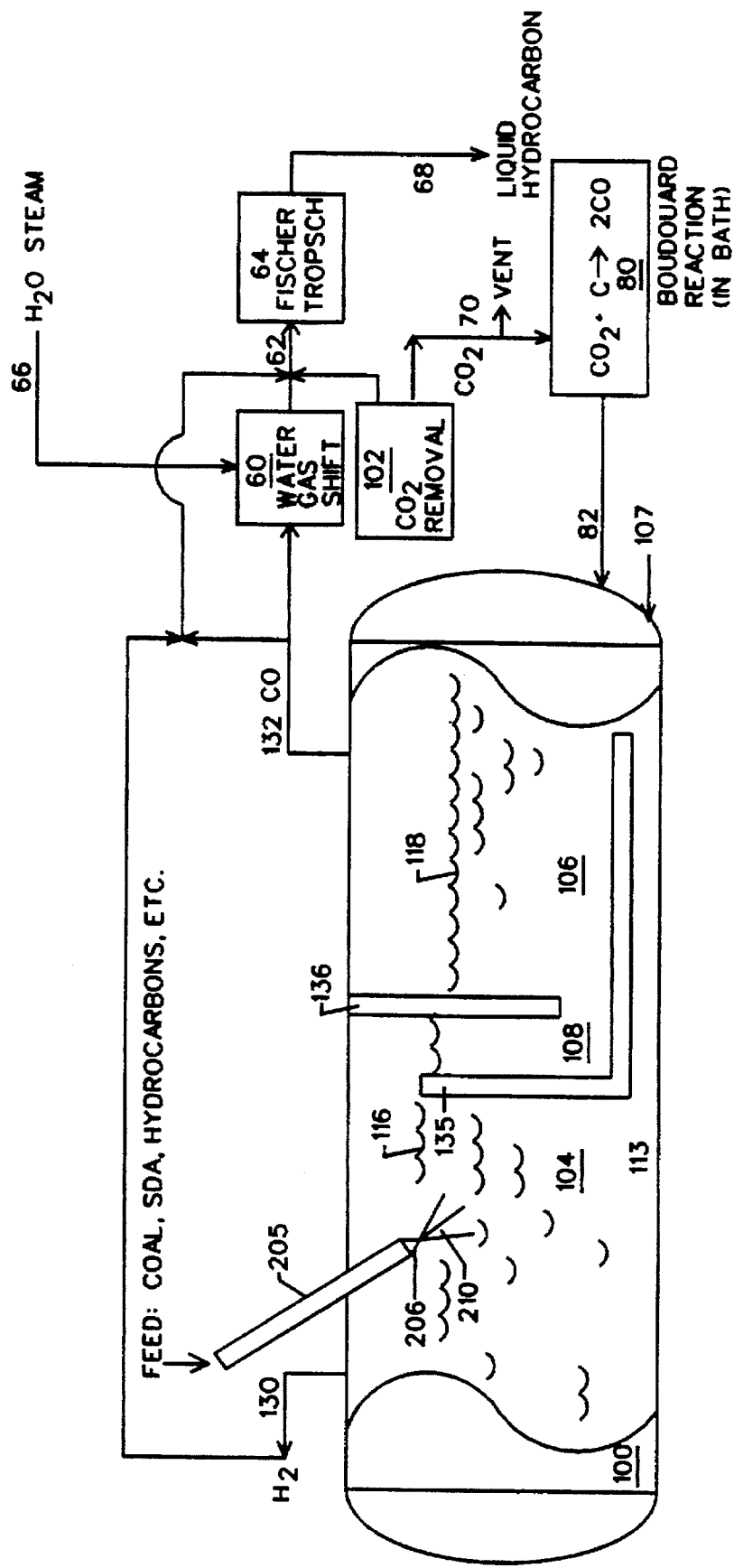
FIG. 6 is a schematic of a slanted lance which may be above molten surface or can preferably extend into the molten bath.

As shown schematically in FIGS. 4 and 6, the feed 105 will preferably be directed downwardly with sufficient force to pierce the surface (or penetrate through a portion of the depth) of the molten metal bath 104, more preferably with sufficient force to cause bubbling and mixing of the feed with the liquid metal bath, and most preferably will extend below the molten surface. FIG. 4 shows a preferred lance and shows the lance in place as element 205 impinging on the surface of the liquid so as to depress it and actually pierce it, forming bubbles. FIG. 5 is a schematic of a more preferred lance. FIG. 5A is a cross sectional area at section 1—1 of the lance, and FIG. 6B is a cross-sectional detail of the lance tip.

Figure 2:
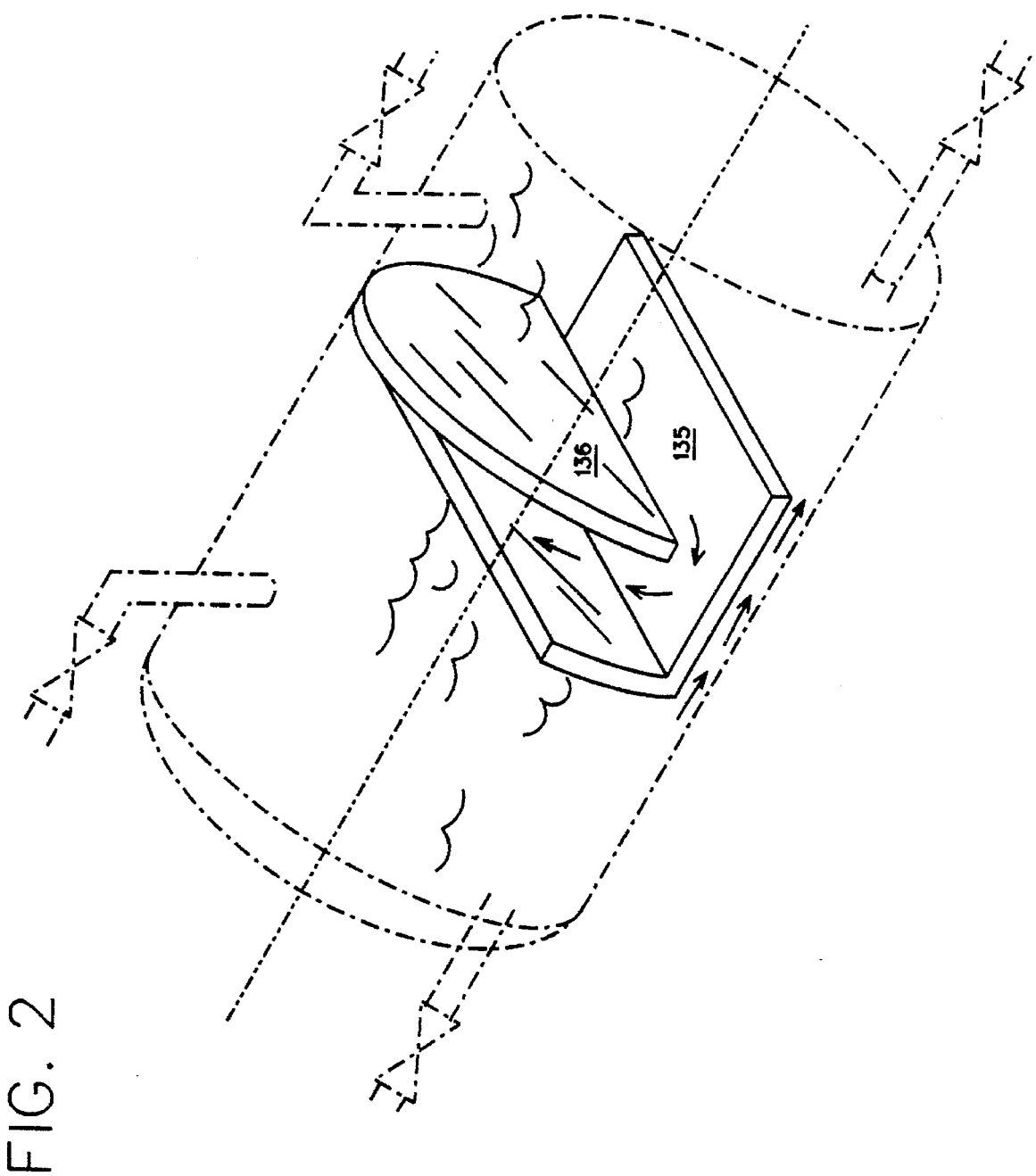
FIG. 2 is a detail of FIG. 1 showing the baffles 135 and 136.

FIG. 2 is a detail of the baffles. Baffle 135 and baffle 136 are shown in more detail in FIG. 2. Note that baffle 135 has both a horizontal and a vertical projection, whereas baffle 136 is primarily vertical in its projection and is sealed hermetically to the edges of refractory-lined steel vessel 100 to effectively separate the gas spaces above the feed zone and the oxidizing zone. Together, baffle 135 and baffle 136 define lower circulation zone 113, recycle zone 108, and additionally separate the two gas phases as mentioned above. The recycle zone 108 is particularly formed by a hearth-like substantially horizontal projection of baffle 135 and the vertical projection of baffle 135 acts with baffle 136 to form a chimney-like vertical section to the recycle zone 108. This configuration is an important feature of the invention because it provides the necessary circulation which moves the carbon first through lower circulation zone 113 from the feed zone to the oxidizing zone 106 after feed zone 104, thence through recycle zone 108 after the carbon has been largely removed in the oxidizing zone closed vessel 100.

In operation, the apparatus of FIG. 1 has a temperature of approximately 1300° C. in feed zone 104, 1400° C. in oxidizing zone 106, and emits hydrogen and CO at approximately those temperatures, respectively. Pressure within closed vessel 100 is preferably from 0 to 50 bars, more preferably from 0.1 to 40 bars, and most preferably from 1 to 25 bars above atmospheric, though higher pressures, even as high as 100 bars can be utilized with special construction if desired for special circumstances.

The feed will generally be fed from a source at ambient temperature, or in any case at much lower temperature than the temperature of the molten bath. Generally, keeping the feed material as cool as possible as it approaches the high temperature of the bath will be desirable to avoid coking within the feed lance. This will generally be accomplished by maintaining a velocity within the conduit in the range of from about 1–10 meters per second, and sizing the conduit so the residence time of said feed material in said conduit is from about 0.1–10 seconds. In general, this will keep the temperature in the conduit through which the feed material is flowing below about 315° C. (about 600° F.), more preferably below about 200° C. (below about 400° F.).

Feed zone 104, preferably contains about 0 to 4.3%, more preferably about 1 to 4%, and most preferably 3% carbon. The carbon content in oxidizing zone 106 is an amount less than in feed zone 104 determined by the circulation rate of the molten metal and the feed rate of carbon to the feed zone. The vessel is a conventional refractory-lined design of steel suitable for the temperature and other surface conditions. The oxygen source is preferably 99.9% oxygen distilled from an oxygen plant operating on air (not shown) but may be air where the additional nitrogen is tolerable.

Referring now to FIG. 4, lance 205 is shown entering through the upper portion of vessel 100 and is directed downwardly toward or preferably extending below the liquid surface of molten bath 104, ending in communication with nozzle 206 which forms a jet 210 of fluid directed downwardly toward the surface of molten bath 100 so as to depress the surface. Preferred embodiments would be feed materials flowing through conduit 205 will have sufficient velocity to actually penetrate below the surface of bath 104 to a depth of 3–100 cm (1–36 inches) below the nozzle 206 tip and cause bubbling, and to reduce coke formation in the conduit. This can be achieved by using a nozzle 206 sufficiently small, as compared to the quantity of feed material fed to the conduit 205, to provide a velocity of the feed material leaving the nozzle in the range of from about 30–300, more preferably about 80–250, and most preferably about 100–200 meters per second (about 100 to 1000, more preferably 250 to 820, and most preferably 325 to 660 feet per second). The pressure drop across the nozzle may be at least 200 psi and the liquid velocity may be at least about 50 meters (150 feet) per second.

It is also desirable to feed liquid feed material through the conduit 205 under a sufficient pressure to prevent the feed material from vaporizing in the conduit which can cause two-phase sputtering and reduce the flow capacity of the conduit 205.

Figure 5B:
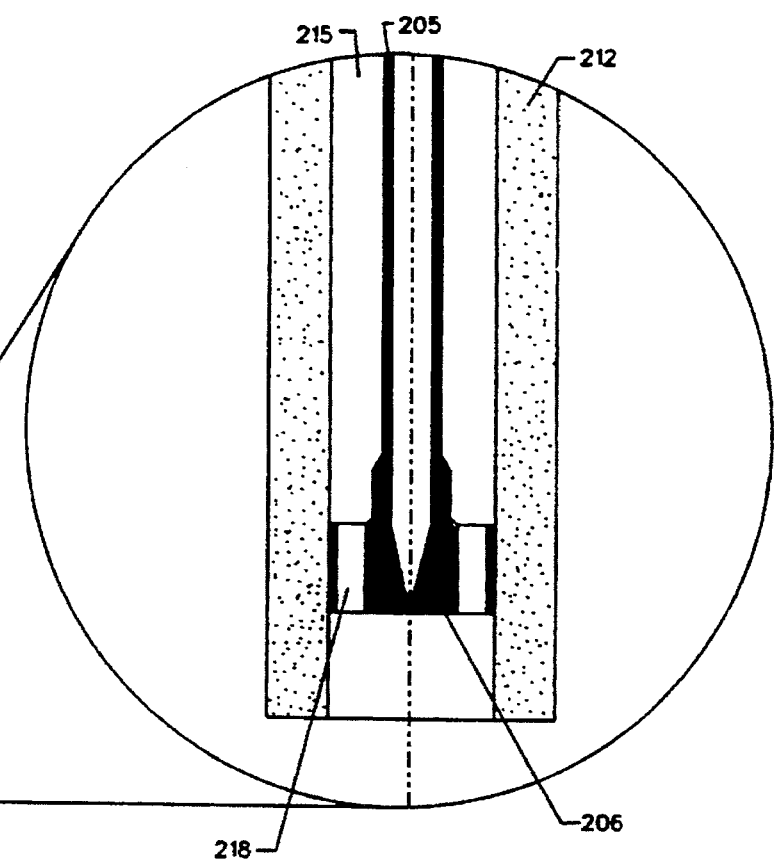
FIG. 5B is cross sectional detail of the lance tip.

The conduit 205 is preferably jacketed with a jacket 212, preferably coaxially (concentric) with the conduit 205. Still more preferably, the conduit (lance) 205 can be surrounded by insulation shown in FIG. 5B as surrounding the jacket to reduce quantities of coolant required to maintain the temperature in the conduit below a minimum temperature to avoid decomposition and/or vaporization in the conduit.

Preferred insulation materials are magnesium oxide or aluminum oxide (alumina) powder or fibers, spinels (mixtures of magnesium oxide and aluminum oxide); preferred materials for the conduit itself are refractory metals, e.g. tantalum, and superalloys such as Inconel™ 625; and preferred materials for the jacket are silicon nitride, alumina, and boron nitride; preferred coolant materials to flow through the annular space 215 include argon, steam, and methane. In a particularly preferred design shown in FIG. 5B, the coolant material itself is ejected axially around the feed material being ejected from nozzle 206 through openings 218, so that the coolant substantially surrounds the feed material exiting from the nozzle and directed toward the surface of the molten bath.

Note that the conduit need not be entirely vertical, it may be slanted or bent or curved so as to provide a horizontal component to the jet 210 below the surface of the molten bath, as shown in FIG. 6. This horizontal component can be valuable in enhancing the circulation of the molten metal from the oxidizing zone to the oxidizing zone by flowing under baffle 135. FIG. 6 shows a slanted conduit and jacket assembly (similar to that shown in detail in FIGS. 5, 5A, and 5B), but slanted so as to direct some of the jet force in a horizontal direction and cause fluid from molten bath 104 to more quickly circulate under baffle 135. (The conduit can also be slanted toward one side of the molten bath so as to cause circulation along one wall of the molten bath, and the baffle 135 can provide a larger lower opening at the point struck by flow from the lance, to further enhance circulation.)

Various feeds are described under the following examples.

EXAMPLES

Example I

Invention Operating on Solvent De-asphalted Bottoms (SDA)

The feed rate is 22.3 tonnes/hour of SDA bottoms. The molten iron circulation is 9,000 tonnes/hour through recycle zone 108 and 1.75 tonnes/hour of hydrogen are emitted through $H_2$ outlet 130 and 43.8 tonnes/hour of CO are emitted through CO outlet 132. The results for this and other Examples are shown in Table A.

Example II

Invention with Methane Heat Balance

The procedure of Example I is followed except that methane is added to the feed for heat balance. The ratio of hydrogen to carbon monoxide in the product gas is approximately 1:1 on a molar basis.

Example III

Invention With Steam Heat Balance

The procedure of Example I is followed, except that steam is added to the feed for heat balance. The ratio of hydrogen to carbon monoxide in the product gas is approximately 1:1 on a molar basis.

Example IV

Invention With Carbon Dioxide Heat Balance

The procedure of Example I is followed, except that carbon dioxide is added to the feed for heat balance. The ratio of hydrogen to carbon monoxide in the product gas is approximately 1:3 on a molar basis.

Example V

Coal Feed to Invention

The procedures of Example I are followed except that the feed is coal and the approximate molar ratio of carbon monoxide to hydrogen is 3:1 and except that 44,000 pounds/hour (20,000 Kg/hour) of steam are injected through oxidizer feed means 107 along with 22,500 pounds/hour of oxygen.

Example VI

Trash Fed to Invention

The procedures of Example I are followed except that the feed is mixed non-metallic trash (largely waste paper) and garbage (largely organic food residue), which is dried by using heat from the process, and the molar ratio of carbon monoxide to hydrogen is approximately 1:1.

Example VII

Methylene Chloride Disposal and Other Chlorinated Organics

The procedure of Example I is followed except that the feed is methylene chloride, which has been contaminated and has no commercial value but represents a substantial disposal problem. Carbon monoxide and hydrogen are produced in a molar ratio of approximately 1:1.5. To neutralize the chlorine and avoid toxic emissions, 2 pounds of slaked lime CaO per pound of methylene chloride is added near the top surface of feed zone liquid level 116 and oxidizing zone liquid level 118, and 2.5 pounds of slag per pound of methylene chloride is permitted to flow outward through an outlet (not shown) which skims the surface of feed zone liquid level 116 and oxidizing zone liquid level 118. The slag comprises largely $CaCl_2$.

Example VIII

Invention with Fischer-Tropsch Synthesis

Figure 3:
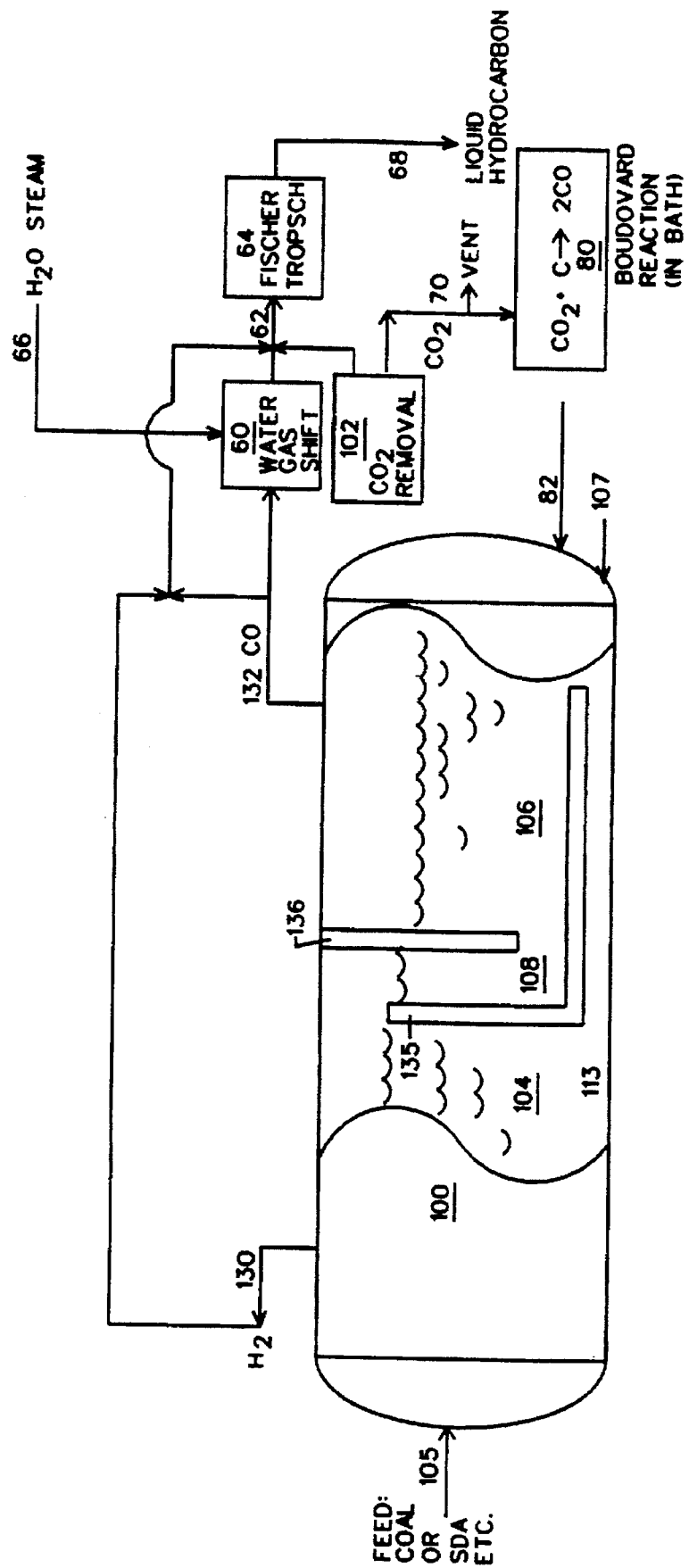
FIG. 3 is a schematic diagram showing the optional water-gas shift reactor 60, Fisher-Tropsch reactor 64, the optional Boudouard reactor 80 which occurs in the molten bath oxidizing zone 106, and the removal of carbon dioxide by means of the Benfield or Pressure Swing Absorption processes.

As shown in FIG. 3, Example I is continued and some of the carbon monoxide produced is mixed with steam 66 reacted to produce $CO_2+H_2$ in water-gas shift reactor 60. The carbon dioxide is separated from hydrogen in $CO_2$ removal closed vessel 102. This hydrogen and hydrogen from $H_2$ outlet 130 are mixed with the remaining CO. Then the syngas 62 is reacted in Fisher-Tropsch reactor 64 to produce Fisher-Tropsch liquids 68. The Fischer-Tropsch liquids comprise naphtha, kerosene, and diesel fuel. By varying conditions of the Fischer-Tropsch process according to well-known techniques, the product distribution may be varied to favor naphtha or diesel, at will.

Example IX

Invention with Fischer-Tropsch and Boudouard

When the process of Example VI is repeated, the $CO_2$ by-product from water-gas shift reactor 60 is fed to zone 106 via line 82, FIGS. 3,4; it reacts with carbon dissolved in the molten metal to form two moles of CO for each mole of $CO_2$ fed to zone 106.

MODIFICATIONS

Specific compositions, methods, or embodiments discussed are intended to be only illustrative of the invention disclosed by this specification. Variations of these compositions, methods, or embodiments are readily apparent to a person of skill in the art based upon the teachings of this specification and are therefore intended to be included as part of the inventions disclosed herein.

Reference made above to any other specification or literature is intended to result in such patents or literature being expressly incorporated herein by reference.

What is claimed is:

1. In a process for decomposing carbon- and hydrogen-containing feed materials in a molten metal bath comprising:
   injecting said carbon- and hydrogen-containing feed materials into said molten bath, dissolving a portion of said carbon in said metal bath, creating a carbon monoxide stream comprising CO from said dissolved carbon, oxidizing a portion of said CO to $CO_2$, recycling said $CO_2$ back to said bath by injecting at least a portion of said $CO_2$ into said molten metal at a point where said molten metal contains substantial quantities of dissolved carbon, whereby said dissolved carbon reacts with said $CO_2$ to form approximately two moles of CO for each mole of $CO_2$, thereby cooling the temperature of said bath, the improvement wherein said step of injecting said feed materials into said bath comprises injecting said feed materials substantially downwardly into said bath under sufficient pressure so as to penetrate the surface of the bath and causing mixing of said feed materials within said molten metal below the surface of said bath, wherein said lance comprises a conduit having a nozzle at a lower end of said conduit, and wherein said feed materials are injected from said nozzle, with the lower end of the lance located below the surface of the bath, wherein said conduit is substantially jacketed, and wherein said process further comprises flowing a cooling media through said jacket so as to substantially cool said conduit and said feed materials flowing therein, and wherein the velocity of the cooling media is controlled to prevent the temperature of the feed materials from exceeding about 315° C. (about 600° F.), and said process further comprises the step of controlling the velocity of the feed materials leaving the nozzle to that in the range of about 30–300 meters per second (about 100–1000 feet per second), whereby coking of the carbon and hydrogen-containing feed materials is prevented within the conduit upstream of the nozzle and within the nozzle, and wherein the velocity of the feed materials leaving the nozzle is sufficient to facilitate mixing of the carbon content thereof, with the molten metal by disassociation.

2. A process according to claim 1, wherein the step of flowing said cooling media through said jacket further comprises discharging said cooling flow media from said jacket so as to substantially surround a jet of feed material exiting from said nozzle.

3. A process according to claim 1, wherein the feed materials as they exit the nozzle are in the gas phase, and wherein said method further comprises controlling the velocity of the feed materials exiting the nozzle to a level sufficient to cause bubbles of gas phase feed materials to form within said molten bath.

4. A process according to claim 1, wherein the feed material are liquid, and said process further comprises controlling the pressure drop across the nozzle to at least about 200 psi, and maintaining the liquid velocity at about 50 meters (150 feet) per second.

5. A process according to claim 1, wherein the molten metal bath comprises iron, and the feed materials comprise hydrocarbons.

* * * * *